Aug. 2, 1949.     E. J. ISBISTER     2,477,615
PULSE DELINEATOR
Filed Jan. 4, 1944
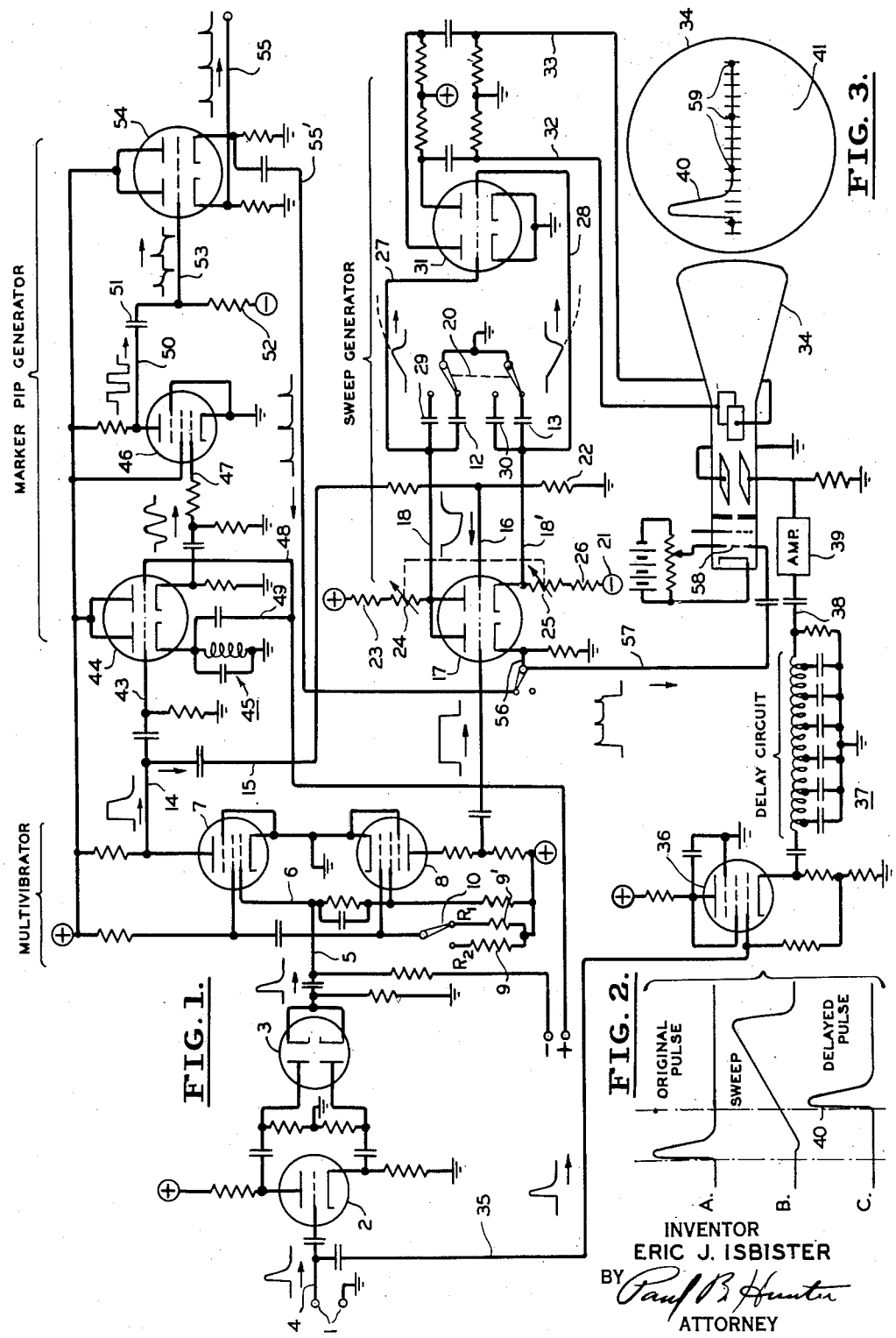
INVENTOR
ERIC J. ISBISTER
BY *Paul B. Hunter*
ATTORNEY Patented Aug. 2, 1949

2,477,615

UNITED STATES PATENT OFFICE 2,477,615

PULSE DELINEATOR

Eric J. Isbister, Garden City, N. Y., assignor to The Sperry Corporation, a corporation of Delaware Application January 4, 1944, Serial No. 516,933

5 Claims. (Cl. 315—22)

1

This invention relates, generally, to sweep circuits applicable to laboratory or all-purpose oscilloscopes, and the invention has reference, more particularly, to a novel form of servo sweep or pulse delineator especially adapted for use in the examination of pulses of short duration recurring at relatively slow or irregular rates.

Oscilloscopes employed for showing pulses, commonly termed synchroscopes, as heretofore generally constructed, are triggered by a pulse which leads the pulse to be examined. However, if such a trigger pulse is not available, and the synchroscope is used to examine the same pulse that is employed to trigger the synchroscope, the leading edge of the pulse cannot be seen. This is because the trigger pulse builds up to a large fraction of its total value before it can trip the sweep, and as the sweep takes time to get started, the entire leading edge of the pulse is generally lost.

The principal object of the present invention is to provide a novel servo sweep or pulse delineator wherein the pulse or signal to be delineated is first employed to trigger the sweep of the synchroscope and then passed through a suitable delay network before being applied to the deflection plates of the scope.

Other objects and advantages will become apparent from the specification, taken in connection with the accompanying drawings, wherein:

Fig. 1 is a wiring diagram of the novel pulse delineator of this invention;

Fig. 2 shows graphs illustrating the original pulse or signal, the sweep and the delayed pulse shown on a time axis; and Fig. 3 is a face view of the synchroscope illustrating the pulse delineated thereon.

Similar characters of reference are used in all of the above figures to indicate corresponding parts.

Referring now to the drawings, the reference numeral 1 designates input terminals which are adapted to be connected to the source of the signal or pulse to be examined. These pulses may be either positive or negative and are supplied to the grid of the phase-inverting tube 2 through lead 4. This phase inversion tube is connected through double diode 3 and leads 5 and 6 to the control grid of the gate tube 7. The diodes of tube 3 are so connected that a positive pulse is selected from the phase-inverting tube 2 regardless of the polarity of the input pulses.

Gate tube 7 and a similar tube 8 are connected together so as to provide an unbalanced multivibrator in which the screens of these pentode tubes are used as plates. This enables the output signals to be taken from the actual plates of these two tubes without reflecting back on the multivibrator. The length of the short side of the resultant unbalanced square wave obtained from this multivibrator 7, 8 determines the duration of the servo sweep as will further appear. Different resistances 9 and 9' are adapted to be selectively connected in the grid circuit of tube 8 by a switch 10 to obtain two lengths of sweep selectively. The time constant of the respective resistor 9 or 9' determines the length of the gate, as is apparent.

The negative gate selected from tube 7 is used to generate the sweep. It will be noted that the plate of tube 7 is connected through leads 14, 15 and 16 to one grid of the double triode 17. The anode and cathode of this half of the triode 17 are shown bridged through leads 18 and 18' by condensers 12 and 13 with a switch 20 in the position shown. The cathode of tube 17 is shown connected to a source of negative potential 21, and the grid is connected to ground through resistor 22 so that this tube stands by normally full on and effectively shorts the condensers 12 and 13. When a negative gate is supplied from tube 7 through leads 15 and 16, the tube 17 is cut-off, thereby effectively removing it from the circuit, and hence allowing the condensers 12 and 13 to charge from the positive plate supply through resistors 23, 24 and 25, 26. The resistors 23, 24, 25 and 26 cause the time constant of this circuit to be adjusted so as to be many times longer than the duration of the gate, so that the condensers 12 and 13 are not charged beyond the linear portion of their charging curves before the negative gate is removed, allowing tube 17 to short the condensers. The fact that these condensers are not charged beyond the linear portion of their charging curves is indicated by the wave forms shown alongside the output leads 27 and 28.

In the event that the gate length is changed by operating switch 10, it will be necessary to also operate switch 20 to substitute condensers 29 and 30 for condensers 12 and 13 in order to maintain the proper relation of charging time constant to gate length. Output leads 27 and 28 are connected to a conventional push-pull amplifier tube 31 which amplifies the sweep voltages so that a sufficient horizontal deflection is obtained, the output of this tube 31 being connected through leads 32 and 33 to the horizontal deflecting plates of the cathode ray tube or synchroscope 34.

In order to obtain the desired time delay of the pulse to be delineated, the input signal is not only fed to tube 2 but is also supplied through a lead 35 connected to lead 4 to the grid of a cathode follower tube 36. This cathode follower tube is employed to drive a delay line 37 which is inserted between the cathode of tube 36 and the vertical deflection plates of cathode ray tube 34, the connection from delay line 37 to the vertical deflecting plates being via lead 38. Preferably, some gain is desirable in the output of the delay line, and for this purpose an amplifier 39 is shown, thereby obtaining usable deflection voltages.

Thus, it will be seen that linear sweeps are put upon the horizontal deflecting plates of the cathode ray tube 34 initiated by the incoming pulse or signal and that this pulse, as delayed by delay line 37, is thereafter placed upon the vertical deflecting plates of the tube 34 to give a true replica 40 of the pulse on the face 41 of tube 34.

Fig. 2 illustrates the original pulse, the sweep derived therefrom through use of the multivibrator and sweep generator circuits, and the delayed pulse 40 as reproduced upon the face 41 of the tube 34, the abscissae of these various graphs A, B and C representing time.

It is often desirable to have marker pips applied to the face 41 of tube 34 so that the relative duration of pulses can be compared. This may be accomplished by also connecting the output of gate tube 7 through lead 43 to a marker pip generator consisting of a double triode 44 having the gate signal supplied to the grid of one-half of this tube. This triode is normally biased full on so that, when the negative gate from tube 7 is applied to its grid, it is cut-off, setting up oscillations in a tuned circuit 45 which has a frequency, for example, of the order of 200 kilocycles per second inserted in the cathode of this half of the tube 44.

These oscillations are amplified and squared in a following amplifier stage 46 whose grid is fed from the other half of tube 44 via lead 47, which other half of tube 44 has its grid connected to the resonant circuit 45 via leads 48 and 49. This other half of tube 44 serves as a cathode follower and assists in the squaring process. After squaring in tube 46, the waves are supplied through an output lead 50 and are differentiated by a condenser 51 acting in conjunction with a connected resistor 52, thereby producing pips as shown which are supplied through lead 53 to the clipping cathode follower tube 54, which tube is normally biased to cut-off so that only the positive pips appear in the cathode of this tube, which cathode is shown connected by leads 55 and 55' for external use.

The pips supplied through leads 55' are shown mixed with a positive base or pedestal supplied from tube 17, this being accomplished through the connections shown at 56 to the cathode of tube 17. The resultant mixed pips are fed by lead 57 to the control grid 58 of the cathode ray tube 34. Since the tuned circuit 45 is tuned to a frequency of the order of 200 kilocycles, the marker pips on the face 41 of tube 34 will be 5 microseconds apart and will appear as bright dots 59 on the trace at 5-microsecond intervals. The positive pedestal or base obtained from tube 17 is used to bias the cathode ray tube on during the sweep, the beam being cut-off during the stand-by intervals.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A pulse delineator comprising a cathode ray tube indicator, a control circuit therefor, said control circuit being adapted to receive a pulse to be delineated, and comprising a gate circuit and a sweep generator controlled therefrom for producing a linear time sweep initiated upon receipt of the pulse signal, the termination of said time sweep being determined by said gate circuit, and a time delay circuit connected for also receiving the pulse signal and serving for placing said signal upon the cathode ray tube after the initiation of the time sweep thereof.

2. A pulse delineator comprising a gate circuit for receiving a pulse signal to be delineated, a sweep generator connected to said gate circuit to be initiated in its operation by said gate circuit upon receipt of the pulse signal, the termination of the sweep being determined by the output of the gate circuit, a cathode ray indicator connected to said sweep generator for producing a sweep upon the operation of said generator, and a delay network connected to receive the pulse signal and also connected to said cathode ray tube for placing the pulse signal thereupon after the initiation of the sweep.

3. Apparatus of the character described, comprising a multivibrator connected for receiving a signal to be analyzed, a sweep generator connected to said multivibrator to be initiated in its operation by said multivibrator upon receipt of a signal, the termination of operation of said sweep generator being determined by said multivibrator, a cathode ray tube indicator connected to said sweep generator for producing a sweep upon the receipt of the signal, a delay network also connected for receiving the signal and serving to delay the same, and means connected with said delay network and said cathode ray tube for effecting delineation of the signal thereon after the initiation of the sweep.

4. A pulse delineator comprising a cathode ray tube indicator, a control circuit therefor, said control circuit comprising a multivibrator acting as a gate circuit connected for receiving the pulse to be delineated, a sweep generator triggered both on and off by said multivibrator and connected to said cathode ray indicator for producing a linear time sweep, whereby both the initiation and termination of said sweep are determined by said gate circuit, a time delay circuit for also receiving the pulse signal and connected for placing the same upon the cathode ray tube after the initiation of the time sweep thereof, and a marker pip generator connected with the output of said multivibrator circuit and to said cathode ray tube for producing time interval indications thereon.

5. A pulse delineator comprising a phase-inverting tube for receiving positive or negative pulses to be examined, an unbalanced multivibrator connected to said phase-inverting tube and serving as a gate circuit, a sweep generator triggered both on and off by said multivibrator gate circuit, said sweep generator serving to produce a linear sweep whose termination and initiation are determined by said gate circuit, a cathode ray indicator having its horizontal deflecting plates connected for receiving the linear sweep of said sweep generator, a delay circuit connected for also receiving the pulse to be delineated and connected to the cathode ray indicator for supplying the pulse to the vertical deflecting plates thereof after the initiation of the sweep, a marker pip generator connected to said multivibrator to be initiated in its operation by said multivibrator upon receipt of a pulse, said marker pip generator being connected to said sweep generator and to said cathode ray tube for producing time pips thereon, said sweep generator serving to supply a bias voltage for biasing the cathode ray tube on during sweep.

ERIC J. ISBISTER.

REFERENCES CITED

The following references are of record in the file of this patent:

UNITED STATES PATENTS

| Number | Name | Date |
|---|---|---|
| Re.22,390 | Lewis | Nov. 9, 1943 |
| 2,121,359 | Luck et al. | June 21, 1938 |
| 2,178,074 | Jakel et al. | Oct. 31, 1939 |
| 2,203,528 | Harnett | June 4, 1940 |
| 2,241,256 | Gould | May 6, 1941 |
| 2,244,513 | Burton | June 3, 1941 |
| 2,284,219 | Loughren | May 26, 1942 |
| 2,350,069 | Schrader et al. | May 30, 1944 |
| 2,373,145 | Sensiper et al. | Apr. 10, 1945 |
| 2,431,766 | Miller et al. | Dec. 2, 1947 |